United States Patent [19]

Lundberg et al.

[11] Patent Number: 4,483,957
[45] Date of Patent: Nov. 20, 1984

[54] ANTIPLASTICIZATION OF POLYMER COMPLEXES

[75] Inventors: Robert D. Lundberg, Bridgewater; Robert R. Phillips, Spring Lake Hgts., both of N.J.

[73] Assignee: Exxon Research & Engineering Co., Florham Park, N.J.

[21] Appl. No.: 551,106

[22] Filed: Nov. 14, 1983

[51] Int. Cl.$^3$ .............................................. C08K 5/05
[52] U.S. Cl. .................................. 524/390; 524/516
[58] Field of Search ............................... 524/390, 516

[56] References Cited

U.S. PATENT DOCUMENTS 3,396,136  8/1968  Dickerson ........................... 524/392
3,907,984  9/1975  Calvert et al. ....................... 524/516
3,931,021  1/1976  Lundberg ............................ 252/49.7
4,118,361 10/1978  Lundberg ............................ 524/392

FOREIGN PATENT DOCUMENTS 817042  4/1981  U.S.S.R. .............................. 524/516

Primary Examiner—Joseph L. Schofer
Assistant Examiner—N. Sarofim
Attorney, Agent, or Firm—Richard E. Nanfeldt

[57] ABSTRACT

The instant invention relates to a process for increasing the viscosity of organic liquids by incorporating in said liquid a minor amount of polymer complex, and 1 to 1000 parts per million by volume of a cosolvent for the ionic groups of said polymer. The polymer complex comprises the reaction product of a metal neutralized sulfonated polymer and a styrene-ring pyridene copolymer, wherein the polymer complex is substantially soluble in said organic liquid, and pendant sulfonate groups which are substantially insoluble in said organic liquid. The cosolvent is selected because it will solubilize the pendant sulfonate groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a polymer complex containing from 0.2 up to 10.0 mole % sulfonate groups which has been neutralized by a basic material selected from Groups IA and IIA, IB and IIB of the Periodic Table of Elements (and also lead, tin and antimony) and 1 to 1000 parts per million by volume of a nonvolatile alcohol or amine cosolvent.

22 Claims, No Drawings

ANTIPLASTICIZATION OF POLYMER COMPLEXES

FIELD OF THE INVENTION

The instant invention relates to a process for increasing the viscosity of organic liquids by incorporating in said liquid a minor amount of two interacting polymers and 1 to 1000 parts per million by volume of a polar cosolvent for the ionic groups of said polymer. The ionic polymer comprises a backbone which is substantially soluble in said organic liquid, and pendant ionic groups which are substantially insoluble in said organic liquid. The second polymer contains amine groups which interact with the ionic counterion and form a complex. A cosolvent is selected which will optionally solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a polymer complex of a vinyl pyridine containing copolymer and a sulfonated polymer containing from 0.2 up to 10.0 mole % ionic groups which has been neutralized by a basic material selected from Groups IA and IIA, IB and IIB and also lead, tin and antimony of the Periodic Table of the Elements, and 1 to 1000 parts per million by volume of, a nonvolatile alcohol or amine as the cosolvent.

BACKGROUND OF THE PRIOR ART

A related case (Number C-1509) has described the preparation of a new family of polymer complexes based on the interaction of a sulfonate ionomer and a second polymer containing basic amine groups. The resulting complex has been shown to be extremely effective in enhancing the viscosity of organic solvents, fuels, and lubricants. Furthermore, it has been shown that the high viscosity of such fluids containing these complexes can be reduced by the addition of suitable polar cosolvents at a level of from ½% up to 10% or more. The instant invention differs markedly from the cited case in that the addition of polar cosolvents can act to increase the viscosity of polymer complex thickener organic at extremely low levels of added cosolvent, for example, as low as one part of alcohol per 1,000,000 parts of organic fluid.

There are cases of prior art dealing with ionic polymers in hydrocarbon. The comments below deal with specific prior art.

U.S. Pat. No. 3,396,136 describes how copolymers of alkenyl aromatic sulfonic acids, when properly neutralized, can be employed as thickeners for nonpolar solvents. Those metal sulfonate systems have been shown to be very effective; however, when employed as two component systems (i.e., ionic polymer plus nonpolar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which, under some conditions, can result in the availability of a small amount of polar cosolvent. In addition, the cited patent is restricted to aromatic sulfonate polymers. The instant invention is concerned with the addition of very small amounts of cosolvents to polymer complexes as described below. The addition of such small amounts of cosolvents to simple solutions of sulfonate ionomers alone has no significant effect on the viscosity.

U.S. Pat. No. 3,366,430 teaches the gelling of organic liquids by the interaction of polar "associative bonds" which includes hydrogen bonding and "ionic crosslinking". Again, this patent specifies that two components are necessary—the associating polymer (or polymers in some cases) and the nonpolar organic liquid. There is no mention of a third polar cosolvent except to point out that such polar liquids should not be present. Specifically, this patent states (Column 2, line 7) that the hydrocarbon liquids to which this invention is to be applied should not contain a substantial portion of a miscible protolytic liquid such as methanol. It is clear that the language of this patent limits this invention to gels and further, that any amount of polar liquids which are present to an extent where they disrupt those gels are undesirable. The instant invention is distinct from that cited in that amounts of such polar compounds, as will break up gel at ambient conditions, are required and in fact the most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (Column 3, line 72) that it is critical that in the preparation of such polymers, no surface active agent, catalyst or other additive be employed which introduces a metallic ion into the system. Therefore, it is preferred to employ ammonium or amine salts. It is clear that this invention (U.S. Pat. No. 3,679,382) specifically precludes the use of metallic counterions—and is directed towards amine or ammonium derivatives. Only metallic counterions are effective in the instant invention—and that, in fact, attempts to employ amine derivatives have not resulted in the results which are the objectives of this invention. Finally, this cited patent does describe (Column 7, lines 13-19) that the addition of alcohols will reduce the viscosity of the thickened hydrocarbon and alter flow characteristics thereof.

U.S. Pat. Nos. 3,931,021 and 4,118,361 describe the use of ionic polymers and required cosolvents in an organic liquid and V.I. Improvers. The instant invention represents an improvement over U.S. Pat. Nos. 3,931,021 and 4,118,361 because in those patents the use of cosolvent reduced the viscosity of such solutions at levels ≧0.1% by volume and had little effect at lower levels. The instant invention describes the effect of much less cosolvent (by as much as 1000× less) acts to increase the viscosity of an organic fluid containing a suitable polymer complex. Clearly the complex is much different from the ionomers described in the cited patents.

SUMMARY OF THE INVENTION

It has been discovered that the viscosity of organic liquids may be conveniently increased by incorporating in said organic liquid a minor amount of a polymer complex which is the reaction product of a sulfonated polymer and a vinyl pyridine-containing copolymer about 1 to about 1000 parts per million by volume of a polar cosolvent. The polymer complex is characterized as having polymer backbones which are substantially soluble in the organic liquid, and pendant sulfonate groups which are substantially insoluble in the organic liquid.

The number of sulfonate groups contained in the sulfonated polymer of the polymer complex is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation, the polymer can be considered to be prepared from a hypothetical monomer having an average molecular weight, which is the average of the two monomer components. Similarly for terpolymers, the same averaging concepts apply; however, three components are involved. For example, ethylene-propylene-ethylidene norbornene (ENB) is a preferred polymer backbone for this invention. A representative terpolymer would have a composition (weight percent) of 50% ethylene, 45% propylene and 5% ENB. This composition has an average repeat unit molecular weight of about 38.9. Thus, sulfonation of this composition, which occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milliequivalents of sulfonic acid groups per 100 gms of polymer. This latter procedure provides a rapid and independent measure of sulfonic acid content in a polymer through simple titration. Both mole percent sulfonate and milliequivalent of sulfonate will be employed to describe the sulfonate polymers employed in this invention.

In general, the sulfonated polymer will comprise from about 4 meq. up to 500 (meg. per 100 g. of polymer, sulfonate groups more preferably about 10 meq. to about 100 meq. per 100 g. pendant sulfonate groups. The sulfonated polymers in the instant invention are neutralized with the basic materials selected from the group consisting of Groups IA, IIA, IB and IIB of the Periodic Table of the Elements and lead, tin and antimony. Sulfonated polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers such as isoprene-styrene sulfonate copolymer formed by a free radical copolymerization process.

Neutralization of the cited sulfonated polymers with appropriate metal hydroxides, metal acetates, metal oxides, etc. can be conducted by means well-known in the art. For example, the sulfonation process as with Butyl rubber containing a small 0.3 to 1.0 mole% unsaturation, can be conducted in a suitable solvent such as toluene with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole %, preferably 90 to 200%. Most preferably, it is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs).

A variety of polymer backbones will display the desirable properties discovered in this invention:

| Sulfonate Polymer | Amine Polymer |
|---|---|
| Sulfo-EPDM | Styrene/Vinyl Pyridine Copolymer |
| Sulfonate Isoprene Copolymers | Vinyl Pyridine/Styrene/ Butadiene Terpolymers |
| Sulfonate SBR Polymers | Isoprene/Vinyl Pyridine Copolymer |
| Sulfonate Butadiene Polymers | Ethylacrylate/Vinyl Pyridine Copolymer and Alkyl Acrylate Copolymers with Vinyl Pyridine, where the Alkyl group varies in carbon number from 1 to 18 |
| Sulfonated Butyl | |
| Sulfonated Acrylate and Methacrylate Copolymers | |
| Sulfonated Block Polymers | Methyl Methacrylate/Vinyl PyridineCopolymer and and Alkyl Methacrylate copolymers with Vinyl Pyridine, wherein the number of carbon groups in the alkyl group varies from 1 to 18 carbon atoms. |
| | Butadiene/Vinyl Pyridine Copolymer |
| | Propylene/Vinyl Pyridine Block Copolymer |
| | Ethylene/Vinyl Pyridine Block Copolymer |
| | t-Butyl Styrene/Vinyl Pyridine Copolymers |
| | Vinyl Pyridine Copolymers with alpha-beta ethylenically unsaturated copolymers or terpolymers. |

The amount of vinyl pyridine in the amine-containing polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The sulfonated polymers of the instant invention may vary in number average molecular weight from 1,000 to 10,000,000, preferably 5,000 to 500,000, most preferably from 10,000 to 200,000. These polymers may be prepared by methods known in the art; for example, see U.S. Pat. No. 3,642,728, hereby incorporated by reference.

It is evident that the sulfonated polymers covered within this invention encompass a broad class of hydrocarbon polymer systems. It is important that these hydrocarbon polymer backbones (in the absence of the sulfonate groups) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by appropriate texts (e.g., Polymer Handbook, edited by Brandrup and Immergut, Interscience Publishers, 1967, section IV-341). In the absence of appropriate polymer-solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with sulfonate groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

The preferred ionic EPDM terpolymers for use in the instant invention are prepared by sulfonation of an EPDM-containing ethylidene norbornene units. Other specific examples of preferred ionomeric polymers which are useful in the instant invention include sulfonated polystyrene, sulfonated poly-t-butyl styrene, sulfonated polyethylene, (substantially non-crystalline) and sulfonated polyethylene copolymers, sulfonated polypropylene (substantially noncrystalline), and sulfonated polypropylene copolymers, sulfonated styrene-methyl methacrylate copolymers, (styrene) acrylic acid copolymers, sulfonated polyisobutylene, sulfonated ethylene-propylene terpolymers, sulfonated polyisoprene, sulfonated polyvinyl toluene, sulfonated polyvinyl toluene copolymers and isoprenestyrene sulfonate copolymers formed by a free radical copolymerization process.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The styrene-vinyl pyridine copolymer of the polymer complex is formed by free radical copolymerization using techniques well-known in the polymer literature. Such polymers can be prepared by a variety of techniques with styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The polymer complex of the sulfonated polymer and the styrene-vinyl pyridine copolymer are formed by forming a first solution of the sulfonated polymer in an organic liquid and a second solution of the styrene-vinyl pyridine copolymer in the organic liquid, wherein the organic liquid which has a solubility parameter of less than 9.5 and is selected from the group consisting of mineral oil, synthetic oil, alkanes, cycloalkanes and aromatics and mixtures thereof. The concentration of the sulfonated polymer in the first solution is about 0.05 to about 10 grams per 100 ml of organic liquid, more preferably about 0.1 to about 5. The concentration of the styrene-vinyl pyridine copolymer in the second solution is about 0.05 to about 10 grams per 100 ml of the organic liquid, more preferably about 0.1 to about 5, and most preferably about 0.1 to about 2. The two solutions of the sulfonated polymer and the styrene-vinyl pyridine copolymer are mixed together to form the polymer complex, wherein either the sulfonated polymer or styrene-vinyl pyridine copolymer can be substantially in excess of the other. The formation of the complex is schematically represented by:

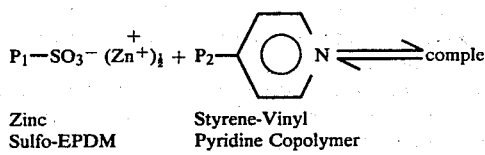 (1)

Zinc Sulfo-EPDM     Styrene-Vinyl Pyridine Copolymer

The presence of an excess of one component over the other offers a unique opportunity to alter the viscosity-temperature profiles of such solutions. In the creation of the complex a combination of two polymers interacting with an excess of one (such as the styrene/vinyl pyridine copolymer), we have created a complex which is, in turn, plasticized. Such a system will display modest viscosity at low or ambient temperatures.

Thus, this concept describes the interaction of two polymers which can give rise to new solution phenomena. A second consequence of this concept is that if such solutions are diluted with non-interactive (less interactive) solvent, such as mineral oil or similar low polarity diluents, the result will be a diminution of the plasticizer component with a relative increase in complex viscosity. Thus, unlike normal polymer solutions which drop off dramatically upon dilution, these solutions may decrease relatively little. Such hydrocarbon or oil solutions have not been available previously. The concentration of the polymer complex in the organic liquid is about 0.05 to about 20 grams per 100 ml, more preferably about 0.1 to about 10, and most preferably about 0.2 to about 10.

The method of the instant invention includes incorporating a polar cosolvent, for example, a polar cosolvent, such as methanol, hexanol, decyl alcohol etc. into the mixture of organic liquid and polymer complex, to solubilize the pendant sulfonate groups. The polar cosolvent will have a solubility parameter of at least 10.0, more preferably at least 11.0, and must comprise from 1 to 1000 parts per million by volume of the total mixute of organic liquid, inomeric polymer and polar cosolvent, more preferably about 1 to about 500 parts per million.

In addition to the requirements for ionic polymer, organic liquid and polar cosolvent, there is the additional and important constraint that the polar cosolvent be more polar than the organic liquid. This is required in order that the proper interaction between polar cosolvent and ionic groups be obtained. If we designate the solubility parameter of the organic liquid as SL, and the solubility parameter of the polar cosolvent as Sp, then we require that:

$S_p \geq S_L + 1.0$

In other words, the polar cosolvent will be substantially more polar than the organic liquid to be thickened.

Normally, the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent.

The interaction of metal sulfonate ionomers and amine containing polymers has been shown to induce a marked increase in viscosity due to interpolymer interactions and thereby induces the formation of a weak soluble physical network. The formation of this network, however, does not preclude strong intramolecular association of the ionomer species among the metal sulfonate groups. As a result, at low polymer levels, we have a combination of inter- and intra-interactions which markedly reduced the viscosity over what we would achieve with just inter-associations. The addition of the alcohol in the very low levels we employ is believed to solvate the intra-associations and promote more interpolymer viscosification, or at least minimize the counter-productive intra-associations. To our knowledge, this is the first demonstration of such behavior.

DESCRIPTION OF THE PREFERRED EMBODIMENTS

The following are preferred embodiments of the instant invention.

EXAMPLE

Preparation of Styrene Vinyl Pyridine Copolymer

A copolymer of styrene and vinyl pyridine was prepared via a free radical emulsion copolymerization process. The preparation was conducted as follows:

In a suitable, stirred reaction vessel under a nitrogen blanket the following ingredients were charged:
120 ml. distilled water
50 g. styrene
3.2 g. sodium lauryl sulfate
0.1 g. dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finely disperse the coagulated polymer. The suspension was filtered and dryed in a vacuum oven at 60° C. for 24 hours.

The resulting product represented 80% conversion of the reactive monomers and contained 1.68% nitrogen corresponding to 12.5 mole % 4-vinyl pyridine incorporation.

EXAMPLE 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated TP 398. The resulting polymer was available as a free-flowing crumb and employed in that form as a blending component in the following examples.

EXAMPLE 3

Preparation of Polymer Complex

The polymer complex of sulfonated EPDM and polystyrene-Co-4-vinyl pyridine is prepared by charging the required amounts of each polymer to a flask, adding xylene in sufficient quantity to produce the desired concentration and stirring at room temperature until a homogeneous solution is obtained. Viscosity at 25° C. of the resulting viscous gel was 1,650,000 cp.

EXAMPLE 4

To 50 ml of this blend solution, we added 250 ml xylene to prepare a solution of 0.5% sulfo EPDM-0.12% styrene-Co-4-vinyl pyridine. The resulting solution was a fluid gel with a viscosity of 5,000 cp (Brookfield, measurement, 3 rpm).

To 50 ml of this (0.5%-0.12%) solution, we added methanol in increments as shown in Table 1, stirred to mix, allowed to stand at least 30 minutes and obtained viscosity after each addition. We observed that mixing (shear) caused a noticable viscosity increase in the jello-like solution. Each solution was allowed to equilibrate at least 30 minutes before the viscosity measurement. This shear effect can also be observed by comparing viscosities at various spindle rpm's as noted in Table 1. Such data demonstrate that the resulting solutions are shear thickening, or dilatant.

Since many modifications and variations of this invention may be made without departing from the spirit or scope of the invention thereof, it is not intended to limit the spirit or scope thereof to the specific examples thereof.

What is claimed is:

1. A method for increasing the viscosity of organic liquids, said organic liquid having a solubility parameter of from about 6 to about 10.5, which comprises incorporating in said organic liquid a minor amount of a polymer complex based on a sulfonated ionomer containing from about 4 to about 500 milliequivalents of functional groups/100 gms interacted with a polymer containing basic amine groups at a level of 4 to about 500 milliequivalents of functional groups per 100 gms of polymer, and about 1 to about 1000 parts per million by volume of a polar cosolvent.

2. The method of claim 1, wherein said polymer complex is reaction product of a sulfonated polymer and a vinyl pyridine copolymer with an alpha-beta ethylenically unsaturated monomer.

3. The method of claim 2, wherein said sulfonate groups are neutralized with basic compounds selected from Groups IIA, IB, and IIB of the Periodic Table of Elements, and basic lead, tin and antimony compounds.

4. The method of claim 2, wherein said polymer complex is incorporated into said organic liquid at a level of from 0.05 to 10 grams/100 ml.

5. The method of claim 4, wherein said organic liquid has a viscosity at 100° F. of less than 35 SUS.

6. The method of claim 4, wherein said organic liquid is a hydrocarbon.

7. The method of claim 2, wherein said sulfonated polymer is in excess of said vinyl pyridine copolymer, with an alpha-beta ethylinically unsaturated monomer.

8. The method of claim 2, wherein said styrene-vinyl pyridine copolymer is in excess of said sulfonated polymer.

9. The method of claim 2, wherein said sulfonated polymer is an EPDM terpolymer.

10. The method of claim 2, wherein said sulfonated polymer is selected from the group consisting of sulfonated ethylene, sulfonated propylene, sulfonated ethylene-propylene copolymers and terpolymers, wherein the third monomer is a nonconjugated diene hydrocarbon having from 5 to 15 carbon atoms and sulfonated polystyrene.

11. The method of claim 1, wherein said polar cosolvent is selected from the group consisting of alcohols.

12. The method of claim 11, wherein said polar cosolvent has a boiling point of at least 50° C.

13. A composition of matter comprising a major amount of an organic liquid, a minor amount of a polymer complex and about 1 to about 1000 parts per million by volume of a polar cosolvent.

14. A composition of matter according to claim 13, wherein said polymer complex is the reaction product of a sulfonated polymer and a styrene-vinyl pyridine copolymer.

15. The method of claim 14, wherein said sulfonated polymer is in excess of said styrene-vinyl pyridine copolymer.

16. The method of claim 14, wherein said styrene-vinyl pyridine copolymer is in excess of said sulfonated polymer.

17. The method of claim 14, wherein said sulfonated polymer is an EPDM terpolymer.

18. The composition of claim 14, wherein said sulfonated polymer is selected from the group consisting of sulfonated ethylene, sulfonated propylene, sulfonated ethylene-propylene copolymers and terpolymers, wherein the third monomer is a nonconjugated diene hydrocarbon having from 5 to 15 carbon atoms and sulfonated polystyrene.

19. The composition of claim 14, wherein said sulfonate groups are neutralized with basic compounds selected from Groups IIA, IB, and IIB of the Periodic Table of Elements, and basic lead, tin and antimony compounds.

20. The composition of claim 14, wherein said polar cosolvent is selected from the group consisting of alcohols.

21. The composition of claim 14 wherein said polar cosolvent is selected from the group of alcohols ROH where R varies from methyl to tridecyl.

22. The compositions of claim 14, wherein said polar cosolvent is selected from the group consists of methanol, ethanol, isopropanol, butanol, hexanol, decanol, and tridecyl alcohol.

* * * * *